(12) United States Patent
Garten (10) Patent No.: US 11,589,133 B2
(45) Date of Patent: Feb. 21, 2023

(54) MEDIA CONTENT DISPLAY SYNCHRONIZATION ON MULTIPLE DEVICES

(71) Applicant: S.A. VITEC, Paris (FR)

(72) Inventor: Eliezer Garten, Los Altos, CA (US)

(73) Assignee: S.A. VITEC, Paris (FR)

( * ) Notice: Subject to any disclaimer, the term of this patent is extended or adjusted under 35 U.S.C. 154(b) by 0 days.

(21) Appl. No.: 17/352,615

(22) Filed: Jun. 21, 2021

(65) Prior Publication Data

US 2022/0408161 A1 Dec. 22, 2022

(51) Int. Cl.
| | |
|---|---|
| *H04N 21/6332* | (2011.01) |
| *H04N 21/242* | (2011.01) |
| *H04N 21/43* | (2011.01) |
| *H04N 21/436* | (2011.01) |
| *H04N 21/6405* | (2011.01) |

(52) U.S. Cl.
CPC ....... *H04N 21/6332* (2013.01); *H04N 21/242* (2013.01); *H04N 21/436* (2013.01); *H04N 21/4307* (2013.01); *H04N 21/6405* (2013.01)

(58) Field of Classification Search
None
See application file for complete search history.

(56) References Cited

U.S. PATENT DOCUMENTS

| | | | | |
|---|---|---|---|---|
| 7,669,219 B2* | 2/2010 | Scott, III | ........... | H04N 7/17318 725/89 |
| 8,046,801 B2* | 10/2011 | Ellis | .................... | H04N 21/4821 725/38 |
| 8,234,395 B2* | 7/2012 | Millington | ............. | G05B 15/02 709/231 |
| RE43,843 E * | 12/2012 | Donahue | ............ | H04B 7/18595 725/144 |
| 8,605,722 B1* | 12/2013 | Sindhu | .................... | H04L 12/18 370/432 |
| 9,171,090 B2* | 10/2015 | Nikain | ................ | H04L 65/4092 |
| 9,986,005 B2* | 5/2018 | Sim | ..................... | H04N 21/4307 |
| 10,390,076 B2* | 8/2019 | Yoshida | ................ | H04L 65/605 |
| 10,575,042 B2* | 2/2020 | Rennison | ......... | H04N 21/41407 |
| 11,080,000 B2* | 8/2021 | Woo | .................... | H04N 21/4852 |
| 11,107,121 B2* | 8/2021 | Gentile | .................... | G09G 5/12 |
| 2002/0067909 A1* | 6/2002 | Livonen | ............ | H04N 21/6125 386/275 |
| 2003/0061333 A1* | 3/2003 | Dean | ................... | H04L 41/0253 709/223 |

(Continued)

*Primary Examiner* — An Son P Huynh
(74) *Attorney, Agent, or Firm* — Maier & Maier, PLLC (57) ABSTRACT

A method for displaying media content on devices respectively linked to media players from a group of media players. The method includes the acts of: transmitting to the media players configuration data including data; transmitting data corresponding to the media content to at least one of the media players; transmitting to the media players data corresponding to a multicast address and to an entry port; selecting by the server a master media player among the at least one media player which received the data corresponding to the media content; sending by the master media player a multicast media stream using the multicast address and the entry port, the multicast media stream being obtained by the master media player from the data corresponding to the media content.

19 Claims, 2 Drawing Sheets

(56) References Cited

U.S. PATENT DOCUMENTS

| | | | |
|---|---|---|---|
| 2005/0028208 A1* | 2/2005 | Ellis | H04N 7/173 725/58 |
| 2005/0251827 A1* | 11/2005 | Ellis | H04N 7/163 725/47 |
| 2006/0013208 A1* | 1/2006 | Rietschel | H04R 27/00 370/389 |
| 2007/0038999 A1* | 2/2007 | Millington | G06F 16/63 718/100 |
| 2007/0157281 A1* | 7/2007 | Ellis | H04N 7/17309 725/134 |
| 2008/0123647 A1* | 5/2008 | Chen | H04L 12/2861 370/390 |
| 2008/0198847 A1* | 8/2008 | Yamagishi | H04N 7/17318 370/390 |
| 2010/0111491 A1* | 5/2010 | Kamoto | H04N 21/242 386/207 |
| 2011/0069940 A1* | 3/2011 | Shimy | H04N 5/44543 386/296 |
| 2011/0078717 A1* | 3/2011 | Drummond | H04N 21/4788 725/14 |
| 2012/0011550 A1* | 1/2012 | Holland | H04N 21/40 725/78 |
| 2012/0233346 A1* | 9/2012 | Sang | H04L 65/611 709/231 |
| 2013/0064245 A1* | 3/2013 | Wei | H04L 45/16 370/390 |
| 2013/0173765 A1* | 7/2013 | Korbecki | H04N 21/42209 709/221 |
| 2014/0269757 A1* | 9/2014 | Park | H04N 21/4307 370/432 |
| 2016/0157026 A1* | 6/2016 | Guindi | H04R 25/552 381/60 |
| 2018/0136893 A1* | 5/2018 | Mirarchi | G09G 5/12 |
| 2018/0310042 A1* | 10/2018 | Mayalil | H04N 21/23424 |
| 2020/0275149 A1* | 8/2020 | Su | H04N 21/61 |

* cited by examiner

MEDIA CONTENT DISPLAY SYNCHRONIZATION ON MULTIPLE DEVICES

FIELD

The present invention relates to the display of media contents (for example, videos or images) throughout several devices (for example, several TV screens or several user equipment) in a synchronized manner. It relates more precisely to optimization of the synchronization of digital signage displaying.

Indeed, when displaying media contents and more specifically digital signage on multiple devices in a geographical area, for example in a building, an airport hall, a stadium hall or any local area, expectations are high to display (for example to play a video content, to display information . . . ) a media content in a synchronized manner on several screens.

BACKGROUND

Several technics are implemented to synchronize the displaying. For example, the media content (more precisely the data corresponding to the media content, for example, a file containing the media content) may contain a time at which the media content should be displayed and each media player related to each device may have a clock enabling the media player to display the media content at the planned time.

However, this requires the media player to be well synchronized and therefore requires a complex implementation which is often more costly. In addition, such system does not offer flexibility, for example when adding a new media player to the system or when the network of the geographical area or a central entity of the system fails.

SUMMARY

The present invention aims at improving the situation.

To this end, the invention relates to a method for displaying media content on devices of a group of devices, each device of the group of devices being respectively linked to a media player from a group of media players, the method comprising the acts of:

Transmitting by a server to the media players of the group of media players configuration data comprising data corresponding to a display area and data related to an identification of the media content to be displayed in the display area;

Transmitting by the server or another server data corresponding to the media content to at least one of the media players of the group of media players, said data comprising the data related to the identification of the media content;

Transmitting by the server to the media players of the group of media players data corresponding to a multicast address and to an entry port, said data being associated to the identification of the media content;

Selecting by the server a master media player among the at least one media player which received the data corresponding to the media content;

Sending by the master media player a multicast media stream using the multicast address and the entry port, the multicast media stream being obtained by the master media player from the data corresponding to the media content.

This enables each media player to display on its corresponding device the media content in a synchronized manner with the other media players. Indeed, when the master media player multicast to the other media players of the group a media stream, each of them is able to display this stream in a relatively synchronized manner with the other media players, since:

the processing required to decode the stream is relatively fast (in real time processing) which may not be the case to obtain a stream from the data corresponding to the media content, which require more processing (for instance transcoding in format) and overall different processing according to each media player (for which duration of the processing may differ), and that due to multicasting the stream to the media players of the group, the time lag between the receptions of the stream at each media player is negligible.

In addition, there is no need to implement complex synchronization technics between the media players of the group of media players (for example, clock synchronization technic) requiring a central entity to perform the synchronization or requiring the media players to exchange data between one another. Therefore, the network overload and the network complexity are not affected, easily enabling scaling of the system. In addition, the server which sends the data corresponding to the display area, the data related to an identification of the media content, the data corresponding to the media content, the data corresponding to the multicast address and to the entry port does not need to be located near the media players, this also simplifies the structure and enhance the flexibility of the system.

By group of devices it is understood devices on which it is intended to display the media content in a synchronized manner. The number of devices is not limited. Each of these devices, or subgroup of devices, is linked to a media player who may transfer a video stream to the device (or subgroup of devices) based on the data media stream received.

By data corresponding to a display area it is understood data defining an area on the screen where the media content should be displayed. It is for example, any data indicating an area of pixels on a screen. Such data enables each media player to determine said area. By data related to an identification of the media content it is understood any data which identifies the media content, for example a name of the media content, a path in a storage to the data corresponding to media content, an ID number of the media content, a name of a file corresponding to media content, etc. Therefore, such data related to an identification of the media content enables each media player to determine what content is to be displayed in the display area.

By data corresponding to a multicast address and to an entry port it is understood data enabling the media players to retrieve the multicast address and the entry port. A multicast address is an address to which is sent (or used to send) data and through which each among several media players may receive the data. For example, a router may receive the data sent and transmit it to all the media players of the group of media players which are in the same LAN than the router and eventually are registered as receivers for the data sent at the multicast address. The entry port is the port on the media player side through which the data is to be received. The multicast address may be an IP address and the entry port may be a TCP or an UDP port number.

By data corresponding to a multicast address and to an entry port being associated to the identification of the media content it is understood that the media players are enabled to determine that the data corresponding to the media content is to be received via the multicast address and the entry port.

By master media player it is understood any media player selected by the server to perform the sending of the multicast media stream. This media player may be selected among the media players which received the data corresponding to the media content, alternatively, the media player selected may not have received the data corresponding to the media content yet, and will start performing the sending once the data received.

By multicast media stream it is understood a media delivered in a multicast and streamed manner. This stream is obtained from the data corresponding to the media content to obtain a format which can be streamed, for example H.264, HEVC, VP8 or VP9. Therefore, the master media player is a streaming server and the other media players are streaming clients.

By data corresponding to the media content it is understood that the media content is in a file type format (which necessitate the entire file to be read or decoded) in contrary to the media stream where the media content is in a stream type format (which can be read and/or decoded as it goes).

The media players may send acknowledgements to the server when they receive the data corresponding to the media content and/or the configuration data from the media players. Each media player which receives the data corresponding to the media content may store it to a local storage. The server may relate on the acknowledgements to select the master media player.

According to an aspect of the invention, the method further comprises sending by the server to the media players of the group of media players instructions to start displaying in the display area the media content based on the media stream received through the multicast address and the entry port.

Therefore, the display of the media content may be triggered by instructions from the server. The displaying can therefore be triggered once the multicast media stream is already being received by the media players. Thus, when receiving the instructions the media players may start immediately the displaying. This enables to start the displaying by the media players at the same time except the time difference between the receptions of the instructions, which may be negligible. In addition, such instructions enable to reduce latency between the decision to display the media content and the moment the media content is effectively displayed, since to trigger the displaying only sending instructions is required and no longer processing data.

By instructions it is understood computer instructions sent to the media players.

According to an aspect of the invention, the method further comprises determining the group of media players such as the media players of the group of media players are in a local network or in several adjacent local networks.

This enables to ensure that the time lag between the receptions of the media stream at each media player is negligible.

The content zone is the zone in which all the devices and/or of the media players of the group are positioned. Therefore, advantageously this content zone corresponds to media players that are in the same local network or at least not separated by several networks, for example, they are in two networks that are linked together by one entity. By two adjacent local networks it is understood two local networks that are not separated by another network. Several adjacent local networks are two by two adjacent networks.

According to an aspect of the invention, the method further comprises, when the at least one media player comprises at least two media players and if the multicasting of the media stream is interrupted, selecting another master media player among the at least one media player which received the data corresponding to the media content and sending by the another master media player a multicast remaining media stream using the multicast address and the entry port, the multicast remaining media stream being obtained by the master media player from the data corresponding to the media content.

This enables any other media player which has received the data corresponding to the media content to replace the master media player in case this one fails or loses connection involving interruption of the stream. In this case the server selects another master player which performs the multicast in place of the master media player. The replacement of the master media player does not require any action on the media players which continue to receive the remaining media stream through the same multicast address and the entry port. The remaining media stream is displayed on the devices by the media players of the group in a synchronized manner for the same reasons as for the media stream. In addition, the replacement may be done very quickly, since the another media player has already the media content when the master media player fails and therefore could have prepared the remaining media stream in real time, leading to an almost immediate replacement. Finally, this enables a more robust system since there is no single point of failure.

According to an aspect of the invention, the remaining media stream obtained from the data corresponding to the media content is further obtained according to a part of the media stream already received from the master media player by the another master media player.

This enables the remaining media stream to start where the media stream stoped. Indeed, based on the media stream already received by the another master media player, this one can determine the part of the media content that remains to play and therefore multicast a stream accordingly.

According to an aspect of the invention the method further comprises, if a new media player is added to the group during one of the acts, transmitting by the server to the new media player the data corresponding to the multicast address and to the entry port.

Therefore, the new media player can, after receiving the multicast address and the entry port, receive the media stream through the multicast address and the entry port and therefore display the same media content as the other media players. This does not require sending the data corresponding to the media content or performing any synchronization of the new media player with the other media players of the group. Adding a new media player to the group is therefore simple and enables the new media player to display very quickly the media content in a synchronized manner. In addition, the new media player can be added to the group even when the media stream is already being multicasted, the new media player therefore displays the content media streamed and displayed by the other media players.

According to an aspect of the invention the media player selected as the master media player is the first media player to complete a receiving of the data corresponding to the media content.

By selecting the first media player to complete the receiving of the data corresponding to the media content, the time between the sending of the data corresponding to the media content and the displaying of the media content can be reduced, since processing of the data corresponding to the media content can start earlier. The server may select as master media player, the media player from which the acknowledgement is the first acknowledgement received. It may not be the first media player to complete a receiving of the data corresponding to the media content, however, it is a good approximation enabling to reduce the time between the sending of the data corresponding to the media content and the displaying of the media content.

According to an aspect of the invention, the method further comprises:

for each media player of the group of media players, sending to the server an acknowledgement related to the receiving of the configuration data and/or the data corresponding to a multicast address and to an entry port; and if the server received the acknowledgement of all the media player of the group of media players, sending instructions by the server to the master media player to perform the multicasting.

This enables to ensure that all the media players have received the minimum information needed to receive the multicast media stream, and therefore, avoid media players not being able to display the media content at the same time.

According to an aspect of the invention, the method further comprises:

Sending by the server or the another server to the master media player data corresponding to a new media content;

Sending by the master media player a multicast new media stream using the multicast address and the entry port, the multicast new media stream being obtained by the master media player from the data corresponding to the new media content.

This enables the master media player to switch from multicasting the stream corresponding to the media content to a new media stream corresponding to the new media content. Therefore, the media content may be switch in a transparent way for the media players of the group which receive, at the place of the media stream, the new media stream through the same multicast address and the entry port and thus displays the new media content at the place of the media content without any further action required on the side of the media players.

A second aspect of the invention concerns a computer program product comprising program instructions code stored on a computer-readable medium to perform the method as described previously when said instructions are executed by a processor.

A third aspect of the invention concerns a server for managing displaying media content on devices of a group of devices, each device of the group of devices being respectively linked to a media player from a group of media players, the server comprising:

a processor, and a non-transitory computer-readable medium comprising instructions stored thereon, which when executed by the processor, configure the server to:

Send to the media players of the group of media players configuration data comprising data corresponding to a display area and data related to an identification of the media content to be displayed in the display area;

Send to the media players of the group of media players data corresponding to a multicast address and to an entry port, said data being associated to the identification of the media content;

Select a master media player among the media players which received a data corresponding to the media content;

Send instructions to the master media player to send a multicast media stream using the multicast address and the entry port, the multicast media stream being obtained by the master media player from the data corresponding to the media content.

A fourth aspect of the invention concerns A master media player for displaying media content on devices of a group of devices, each device of the group of devices being respectively linked to a media player from a group of media players including the master media player, said master media player comprising:

a processor, and a non-transitory computer-readable medium comprising instructions stored thereon, which when executed by the processor, configure the master media player to:

Receive from a server configuration data comprising data corresponding to a display area and data related to an identification of the media content to be displayed in the display area;

Receive from the server or another server data corresponding to the media content, said data comprising the data related to the identification of the media content;

Store the data corresponding to the media content to a local storage of the master media player;

Receive from the server data corresponding to a multicast address and to an entry port, said data being associated to the identification of the media content;

Receive instructions from the server to send a multicast media stream using the multicast address and the entry port, the multicast media stream being obtained by the master media player from the data corresponding to the media content.

BRIEF DESCRIPTION OF DRAWINGS

The present invention is illustrated by way of example, and not by way of limitations, in the figures of the accompanying drawings, in which like reference numerals refer to similar elements and in which.

DETAILED DESCRIPTION

Figure 1:
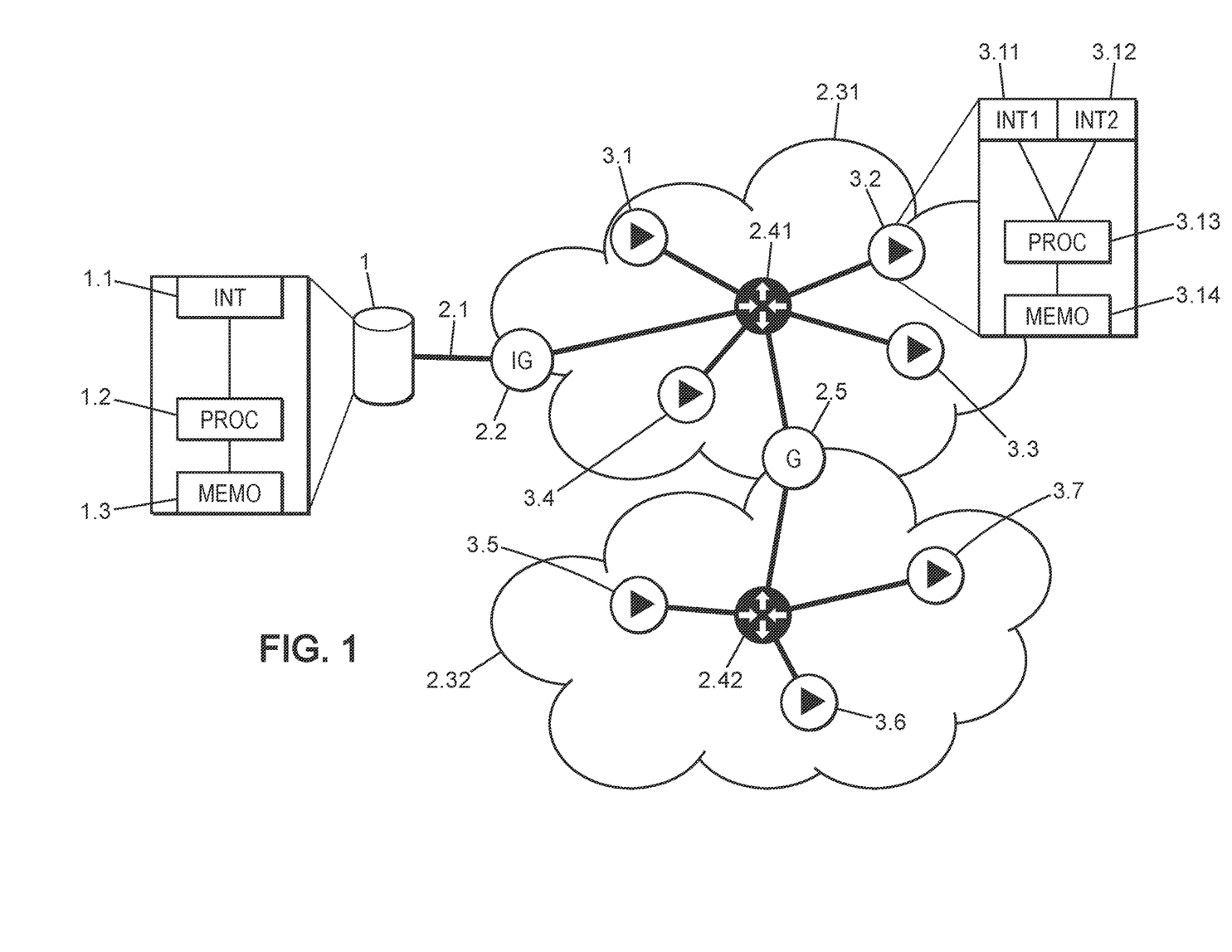
FIG. 1 illustrates a system comprising a server and a group of media players according to the invention.

Referring to FIG. 1, there is shown a server 1 which can communicate via internet 2.1, an internet gateway 2.2, local networks 2.31 and 2.32, routers 2.41 and 2.42 and a gateway 2.5 with media players 3.1 to 3.7.

Each media player 3.1 to 3.7 is linked to a device, for example a screen, which is not represented on FIG. 1. Each media player 3.1 to 3.7 can therefore display images or videos on their corresponding device.

In the example of FIG. 1, only one server is used to manage the displaying performed by the media players and to provide the data corresponding to the media content (for example, a file including the media content). In an equivalent way, two servers can be used, one dedicated to the providing of the data corresponding to the media content and another server which manages the media players.

The server 1 comprises one network interface module (INT) 1.1, one processing module (PROC) 1.2 and a memory unit (MEMO) 1.3. The MEMO 1.3 comprises a non-volatile unit which retrieves the computer program and a volatile unit which may store the parameters for the implementation of the invention. For example, the volatile unit stores:

- configuration data including data corresponding to a display area (for example an area on a screen of the device defined by coordinates) and data related to an identification of the media content (for example, the name of the file of the media content to be displayed on the screen);
- data corresponding to a multicast address (for example, an IP address) and to an entry port (for example, a TCP or an UDP port number);
- data corresponding to the media content;
- instructions comprising a time to display or an immediate displaying instruction;
- information related to each media player, for example the group of media players in which the media player is, the acknowledgements received from the media player, the time of reception by the server of these acknowledgements, the position of the media player, etc.

The PROC 1.2 is configured to configure the INT 1.1 to transmit the configuration data, the data corresponding to a multicast address and to an entry port and the data corresponding to the media content (or new media content). The PROC 1.2 may also be configured to configure the INT 1.1 to transmit the instructions to the master media player and/or to the other media player. The PROC 1.2 is configured to select a master media player among the media players. The PROC 1.2 may be configured to determine the group of media players, for example considering the media players 3.1 to 3.6 as being in the group of media players.

The media players 3.1 to 3.7 comprise the same or similar inside structure, in FIG. 1 only the structure of media player 3.2 is detailed. Media player 3.2 comprises one network interface module (INT1) 3.11, one device interface module (INT2) 3.12, one processing module (PROC) 3.13 and a memory unit (MEMO) 3.14. The MEMO 3.14 comprises a non-volatile unit which retrieves the computer program and a volatile unit which may store the parameters for the implementation of the invention. For example, the volatile unit stores:

- configuration data and data corresponding to the multicast address and to the entry port. For example, the volatile unit stores a file including a definition of a displaying area, the identification of the media content to be displayed in that area (for example the name of the file containing the media content) and the multicast address and entry port from which a media stream corresponding to the media content to be displayed may be obtained;
- data corresponding to the media content if received by the media player;
- information relative to the position of the media player.

When the media player 3.2 is selected as a master media player, the volatile unit stores:

- an indication that the media player 3.2 is the master media player;
- data corresponding to the media content adapted to the format of the multicast media stream.

The PROC 3.13 is configured to configure the INT1 3.11 to receive from the server 1 the configuration data, data corresponding to the multicast address and to the entry port and data corresponding to the media content if received.

When the media player 3.2 is selected as a master media player, the PROC 3.13 is configured to obtain and send the multicast media stream. For example, the PROC 3.13 encodes the media content included in the fil received into a H.264, HEVC, VP8 or VP9 format.

The PROC 3.13 is configured to configure the INT2 3.12 to transmit a video stream to the device to which the media player 3.2 is linked. This video stream is obtained by decoding the multicast media stream, the images of the video stream containing in the corresponding area indicated in the configuration data images of the media content. The remaining part of the images of the video stream can be obtained with other media contents process according to the invention and/or a classical video stream, for example, a TV stream.

The transmission performed from the server 1 to the media players may be performed in any classical manner through internet 2.1 and the different local networks 2.31 and 2.32. For example, unicast transmission or multicast transmission may be implemented.

For multicasting the stream, classical multicasting procedure may be used, for example, the procedure for multicasting provided with IPv4. The stream multicasted by the master media player is sent using the multicast address which in the local networks identifies a multicast group which comprises the group of media players and the gateway between the two local networks. The router 2.41, which is subscribed to this multicast group, receives the stream and duplicates it and sends it to the media players 3.1, 3.3 and 3.4 of the network 2.31 and to the gateway 2.5 which transmits the stream to the router 2.42. The router 2.42, which is also subscribed to this multicast group duplicates the stream received and sends it to the media players 3.5 and 3.6 of the network 2.32.

Figure 2:
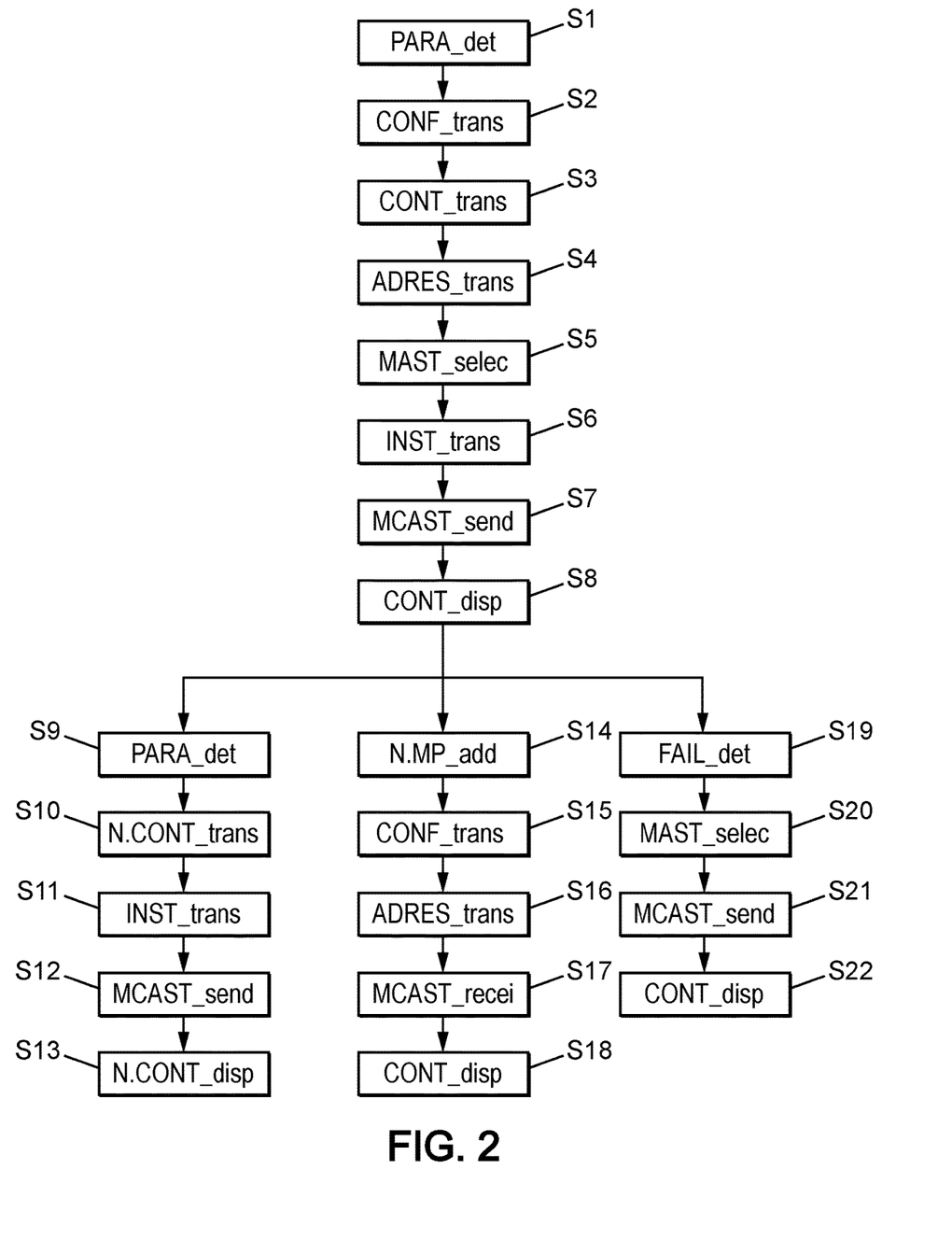
FIG. 2 illustrates a flowchart representing the steps according to an embodiment of the invention.

Referring to FIG. 2, there is shown a flowchart of the steps according to an embodiment of the invention.

At step S1 the displaying of the digital signage is parameterized, therefore, the operator:

- defines the area where the media content is to be displayed on the screen;
- identifies the media content;
- stores the media content in the volatile unit of the MEMO 1.3;
- defines the group of media players, that is, defines the media players 3.1 to 3.6 which will display the media content;
- the operator may also determine when the multimedia content should be displayed.

These parameters are stored in the volatile unit of the MEMO 1.3 of the server 1. The server may determine the multicast address and the entry port.

At step S2 the server 1 transmits to the media players of the group of media players the configuration data.

For example, the server 1 may transmit coordinates of the display area $(X_A, Y_A, X_B, Y_B, X_C, Y_C, X_D, Y_D)$ and the name of the file containing the media content.

On reception of the configuration data each media player may create a file including for example the coordinates of the display area and the name of the file containing the media content.

Optionally, the media players can send to the server 1 acknowledgements when they receive the configuration data.

At step S3 the server 1 transmits to the media players of the group of media players the data corresponding to the media content.

For example, the server 1 transmits a file containing the media content to the media players of the group.

Alternatively, the server 1 may not send the data corresponding to the media content to all the media players of the group, for example, only to few media players. These media players may have a greater computing power than the other media players of the group, enabling to process more efficiently the file containing the media content.

This step can also be performed by another server 1 as previously indicated.

Upon receipt of the data corresponding to the media content each media player that received this data may store it on a local storage for example on its non-volatile unit of the MEMO 3.14.

Optionally, the media players can send to the server 1 acknowledgements when they receive the data corresponding to the media content.

At step S4 the server 1 transmits to the media players of the group of media players the data corresponding to a multicast address and to an entry port. This data is associated to the identification of the media content. Therefore, the media players can identify the media content streamed via the multicast address and the entry port.

For example, the server 1 send a message containing an IP address specific for multicasting and a TCP/UDP port: 224.0.0.0/1935. This message also contains the identification of the media content.

Optionally, the media players can send to the server 1 acknowledgements when they receive the data corresponding to a multicast address and to an entry port.

At step S5 the server 1 selects among the media players of the group a master media player. Here the master media player will be media player 3.2.

The selection of the master media player can be done randomly or based on criteria. For example, the master media player can be selected among the media players of the group based on:
  the computing power of the media players (this can be defined before implementing the invention); or
  the first media player to receive the data corresponding to the media content (this may be defined based on the acknowledgements sent by the media players when receiving the data corresponding to the media content).

At step S6, the server 1 sends instructions to the master media player. These instructions instruct the master media player to send a multicast media stream using the multicast address and the entry port.

As an instruction, the server may simply indicate that the media player has been selected as a master media player. This enables to simplify the instruction when there are no doubts on the multicast stream to send. Otherwise, the instruction may also indicate which media content is to be streamed.

When receiving the instruction, or alternatively when receiving the data corresponding to the media content, the master media player can process this data to obtained data ready to be streamed. For example, video media content can be encoded in H.264, HEVC, VP8 or VP9 format.

At step S7, the master media player 3.2 sends a multicast media stream using the multicast address and the entry port.

For example, the master media player sends to the address and port 224.0.0.0/1935 the stream of the media content.

The media players of the group, which are registered in the multicast group to which are subscribed the different routers 2.41 and 2.42, receive on their port 1935 the media stream corresponding to the media content.

At step S8, the media players of the group display the media content on the devices according to the configuration information received. The displaying of the data may not be triggered by the reception of the multicast media stream.

Indeed, the server 1 can send a message instructing the media players of the group (therefore not media player 3.7) to display media content either when receiving these instructions or at a specific time defined in the instructions. The displaying may therefore be triggered when the stream is already being sent by the master media player 3.2. In addition, these instructions may be sent when the server 1 received both, the acknowledgements related to the receiving of the data corresponding to a multicast address and the acknowledgements related to configuration data, from all the media players of the group.

When receiving the multicast media stream or when displaying is triggered by the instructions, each media player decodes the multicast media stream to build a video stream which is transmitted to the device. As previously indicated, other streams may be used in addition to the multicast media stream to build the video stream. These streams may also result from the steps of the invention. The video stream may also be built using a classical stream, for example a TV stream.

At step S9 the operator parameters the server 1 so that it manages the media players to display a new media content in place of the media content already being displayed.

Therefore, the operator only needs to store the new media content in the volatile unit of the MEMO 1.3 of the server 1.

At step S10, the server performs the same as in step S3 except the media content is replaced by the new media content, that is, for example, the server 1 transmits a file containing the new media content to the media players of the group. The server 1 may also limit the transmission to the master media player 3.2.

On reception of the data corresponding to the new media content each media player that received this data may store it on a local storage for example on its non-volatile unit of the MEMO 3.14.

At step S11, the server 1 sends instructions to the master media player as described in step S6. That is, the server 1 sends instructions to the master media player instructing it to send a multicast new media stream using the multicast address and the entry port. The multicast new media stream is obtained based on the new media content as described above with the media content.

At step S12, the master media player performs the same as in step S7. That is, the master media player 3.2 sends the multicast new media stream using the same multicast address and the same entry port.

The media players of the group which were registered in the multicast group to which are subscribed the different routers 2.41 and 2.42 receive on their port 1935 the multicast new media stream corresponding to the new media content.

At step S13, the media players of the group display the new media content in place of the media content on the device as described in step S8.

Therefore, replacing the media content by another media content (new media content) does not require specific action on the side of the media players. The main requirement is to transmit the new media content to the master media player for it to produce a new stream which replaces the multicast media stream in a transparent manner for the other media players.

At step S14, the server 1 adds a new media player 3.7 to the group of media players, while the media players of the group are displaying the media content.

At step S15, the server 1 transmits to the new media player 3.7 the configuration data sent to the other media players of the group.

On reception of the configuration data the new media player 3.7 may create a file including the configuration data.

At step S16 the server 1 transmits to the new media player 3.7 the data corresponding to a multicast address and to an entry port also sent at step S4 to the other media players of the group.

At step S17, the new media player 3.7 is part of the group of media players and therefore is registered in the multicast group to which is subscribed the router 2.42 and thus will receive on the entry port the media stream corresponding to the media content.

At step S18, the new media player 3.7 displays the media content on the device according to the configuration data (the same as for the other media players of the group) received as described in step S8.

At step S19 the master media player suffers a failure that prevents it from continuing to send the multicast media stream. The other media players of the group may report to the server 1 this failure.

At step S20, a new master media player is selected among the media player which has previously received the media content. This selection may be performed by the server 1 when this one receives a report from a media player of the failure of the master media player. The selection may also be done by the media players themselves or may be performed along with the selection of the master media player at step S5, therefore preselecting a new master media player to replace the master media player in case of failure.

At step S21, the new master media player which has been selected, sends a remaining part of the multicast media stream (named multicast remaining media stream) in place of the master media player, as performed in step S7. The multicast remaining media stream is obtained with the media content as for the multicast media stream, but the stream starts where the multicast media stream was stopped (based for example on the multicast media stream received by the new master media player).

At step S22, the media players of the group display the media content on the devices after decoding the remaining multicast media stream as performed in step S8.

Therefore, replacing the master media player by the new master media player does not require specific action on the side of the media players since the multicast address and entry port are maintained, the stream is only sent by a different entity.

The three specific procedures described in FIG. 2, which are represented respectively by steps S9 to S13, S14 to S18 and S19 to S22 can be combined. For example, when adding a new media content the server may also select a new master media player.

The invention claimed is:

1. A method for displaying media content on devices of a group of devices, each device of the group of devices being respectively linked to a media player from a group of media players, the method comprising the acts of:
   transmitting by a server to the media players of the group of media players configuration data comprising data corresponding to a display area and data related to an identification of the media content to be displayed in the display area;
   transmitting by the server or another server data corresponding to the media content to at least one of the media players of the group of media players, said data comprising the data related to the identification of the media content;
   transmitting by the server to the media players of the group of media players data corresponding to a multicast address and to an entry port, said multicast address and entry port being determined by the server, said data being associated to the identification of the media content;
   automatically and dynamically selecting by the server, without requiring human intervention, a master media player among the at least one media player which received the data corresponding to the media content; and
   sending by the master media player a multicast media stream to the other media players of the group of media players using the multicast address and the entry port, the multicast media stream being obtained by the master media player from the data corresponding to the media content.

2. The method according to claim 1, further comprising sending by the server to the media players of the group of media players instructions to start displaying in the display area the media content based on the media stream received through the multicast address and the entry port.

3. The method according to claim 1, further comprising determining the group of media players so that the media players of the group of media players are in a local network or in several adjacent local networks.

4. The method according to claim 1, further comprising, when the at least one media player comprises at least two media players and if the multicasting of the media stream is interrupted, automatically and dynamically selecting another master media player among the at least one media player which received the data corresponding to the media content and sending by the another master media player a multicast remaining media stream using the multicast address and the entry port, the multicast remaining media stream being obtained by the master media player from the data corresponding to the media content.

5. The method according to claim 4, wherein the multicast remaining media stream obtained from the data corresponding to the media content is further obtained according to a part of the media stream already received from the master media player by the another master media player.

6. The method according to claim 4, wherein selecting the another media player does not require human intervention.

7. The method according to claim 1, further comprising, if a new media player is added to the group during one of the acts, transmitting by the server to the new media player the configuration data and the data corresponding to the multicast address and to the entry port.

8. The method according to claim 1, wherein the media player selected as the master media player is the first media player to complete a receiving of the data corresponding to the media content.

9. The method according to claim 1, further comprising:
   for each media player of the group of media players, sending to the server an acknowledgement related to the receiving of the configuration data and/or data corresponding to a multicast address and to an entry port; and
   if the server received the acknowledgement of all the media player of the group of media players, sending instructions by the server to the master media player to perform the multicasting.

10. The method according to claim 1, further comprises:
sending by the server or the another server to the master media player data corresponding to a new media content;
sending by the master media player a multicast new media stream using the multicast address and the entry port, the multicast new media stream being obtained by the master media player from the data corresponding to the new media content.

11. The method according to claim 1, further comprising displaying by the media players the media content on the linked devices after the media players have received the multicast media stream.

12. The method according to claim 1, wherein selecting the master media player is at random.

13. The method according to claim 1, wherein selecting the master media player is based on a pre-stored criterion.

14. The method according to claim 1, wherein selecting the master media player is selecting the first media player among the group of media players to receive the data corresponding to the media content.

15. The method according to claim 14, wherein selecting the first media player among the group of media players to receive the data corresponding to the media content is based on acknowledgements sent by the media players when receiving the data corresponding to the media content.

16. The method according to claim 1, wherein selecting the master media player is based on computing powers of the media players of the group of media players.

17. A computer program product comprising program instruction code stored on a non-transitory computer-readable medium for the execution of the method according to claim 1.

18. A server for managing displaying media content on devices of a group of devices, each device of the group of devices being respectively linked to a media player from a group of media players, the server comprising:
a processor, and
a non-transitory computer-readable medium comprising instructions stored thereon, which when executed by the processor, configure the server to:
send to the media players of the group of media players configuration data comprising data corresponding to a display area and data related to an identification of the media content to be displayed in the display area;
send to the media players of the group of media players data corresponding to
a multicast address and to an entry port, said multicast address and entry port being determined by the server, said data being associated to the identification of the media content;
automatically and dynamically select, without requiring human intervention, a master media player among the media players which received the data corresponding to the media content; and
send instructions to the master media player to send a multicast media stream to the other media players of the group of media players using the multicast address and the entry port, the multicast media stream being obtained by the master media player from the data corresponding to the media content.

19. A master media player for displaying media content on devices of a group of devices, each device of the group of devices being respectively linked to a media player from a group of media players including the master media player, said master media player comprising:
a processor, and
a non-transitory computer-readable medium comprising instructions stored thereon, which when executed by the processor, configure the master media player to:
receive from a server configuration data comprising data corresponding to a display area and data related to an identification of the media content to be displayed in the display area;
receive from the server or another server data corresponding to the media content, said data comprising the data related to the identification of the media content;
receive from the server data corresponding to a multicast address and to an entry port, said data being associated to the identification of the media content; and
receive instructions from the server to send a multicast media stream to the other media players of the group of media players using the multicast address and the entry port, the multicast media stream being obtained by the master media player from the data corresponding to the media content.

* * * * *